(12) United States Patent
Kuo et al.

(10) Patent No.: US 11,809,070 B1
(45) Date of Patent: Nov. 7, 2023

(54) SWITCHABLE PROJECTOR MODULE

(71) Applicant: HIMAX TECHNOLOGIES LIMITED, Tainan (TW)

(72) Inventors: Han Yi Kuo, Tainan (TW); Yin Tung Lu, Tainan (TW); Shi Jen Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/821,184

(22) Filed: Aug. 21, 2022

(51) Int. Cl.
*G03B 21/20* (2006.01)
*G03B 21/14* (2006.01)

(52) U.S. Cl.
CPC ....... *G03B 21/2033* (2013.01); *G03B 21/145* (2013.01); *G03B 21/208* (2013.01)

(58) Field of Classification Search
CPC . G03B 21/2033; G03B 21/145; G03B 21/208

USPC .......................................................... 353/85
See application file for complete search history.

(56) References Cited

U.S. PATENT DOCUMENTS

2020/0228764 A1* 7/2020 Chen ...................... G02F 1/133

* cited by examiner

*Primary Examiner* — Jerry L Brooks
(74) *Attorney, Agent, or Firm* — CKC & Partners Co., LLC

(57) ABSTRACT

A switchable projector module includes a holder, a projector, and a switchable diffuser. The holder includes a first connection tank and a second connection tank, in which the second connection tank is located at a side of the first connection tank. The second connection tank has a spilling glue trench. The projector is engaged with the first connection tank and is configured to project a pattern image onto the second connection tank. The switchable diffuser is engaged with the second connection tank. The switchable diffuser is configured to switch between a first mode and a second mode, so as not to diffuse the pattern image in the first mode and diffuse the pattern image in the second mode.

20 Claims, 10 Drawing Sheets

SWITCHABLE PROJECTOR MODULE

BACKGROUND

Field of Invention

The present disclosure relates to a projector technique. More particularly, the present disclosure relates to a switchable projector module.

Description of Related Art

Currently, in order to endow a projector have both spot and flood functions, the spot projection module and the flood projection module are usually assembled together. Therefore, such a projector needs to occupy the space of two modules, and uses two contacts for driving. As a result, a footprint of the projector cannot be reduced, such that the overall device cannot be effectively miniaturized, and the fabrication and assembly are also complicated, resulting in increased manufacturing costs.

SUMMARY

Therefore, one objective of the present disclosure is to provide a switchable projector module, in which a holder is used to combine a projector and a switchable diffuser, such that one single projector module can provide dual functions of spot and flood, which can significantly reduce the footprint of the switchable projector module.

Another objective of the present disclosure is to provide a switchable projector module, in which a switchable diffuser and a diffraction optical element are integrated with a holder, such that the switchable projector module is easier to assemble and more compact.

According to the above objectives, the present disclosure provides a switchable projector module. The switchable projector module includes a holder, a projector, and a switchable diffuser. The holder includes a first connection tank and a second connection tank, in which the second connection tank is located at a side of the first connection tank. The second connection tank has a spilling glue trench. The projector is engaged with the first connection tank and is configured to project a pattern image onto the second connection tank. The switchable diffuser is engaged with the second connection tank. The switchable diffuser is configured to switch between a first mode and a second mode, so as not to diffuse the pattern image in the first mode and diffuse the pattern image in the second mode.

According to one embodiment of the present disclosure, the first connection tank includes an outer sidewall, and the projector is embedded in the outer sidewall.

According to one embodiment of the present disclosure, an inner side surface of the outer sidewall is inclined towards an outside of the outer sidewall at an angle to guide the projector into the outer sidewall.

According to one embodiment of the present disclosure, the holder further includes a bonding wall disposed in the first connection tank, and a connection portion of the projector is bonded to a bonding surface of the bonding wall through an adhesive.

According to one embodiment of the present disclosure, the first connection tank includes another spilling glue trench between the outer sidewall and the bonding wall.

According to one embodiment of the present disclosure, the projector has a gas exhaust channel disposed in an inner side of the connection portion.

According to one embodiment of the present disclosure, the second connection tank includes an outer sidewall, the holder further includes a bonding wall disposed in the second connection tank and located inside the outer sidewall, and the switchable diffuser is bonded to a bonding surface of the bonding wall through an adhesive.

According to one embodiment of the present disclosure, the spilling glue trench is located between the outer sidewall and the bonding wall.

According to one embodiment of the present disclosure, the projector includes a circuit substrate, a diffraction optical element, and a light-emitting device. The circuit substrate includes various wires, in which the wires are at least divided into a first wire set, a second wire set, and a third wire set. The holder is located on the circuit substrate. The switchable diffuser is electrically connected to the first wire set. The diffraction optical element is disposed in the first connection tank and is electrically connected to the second wire set. The light-emitting device is disposed on the circuit substrate and is electrically connected to the third wire set. The light-emitting device is configured to emit a light beam toward the diffraction optical element. The light beam passes through the diffraction optical element to generate the pattern image.

According to one embodiment of the present disclosure, the holder includes a first connecting wire and a second connecting wire set. The first connecting wire set extends from the second connection tank through an outer side surface of the holder to a bottom surface of the holder for electrically connecting the switchable diffuser and the first wire set. The second connecting wire set extends from the first connection tank through the outer side surface of the holder to the bottom surface of the holder for electrically connecting the diffraction optical element and the second wire set.

According to one embodiment of the present disclosure, each of the first connecting wire set and the second connecting wire set includes two laser direct structuring (LDS) wires.

According to one embodiment of the present disclosure, each of the first connecting wire set and the second connecting wire set includes two insert molding wires.

According to one embodiment of the present disclosure, the second connection tank includes an outer sidewall, the holder has several gas exhaust channels, and each of the gas exhaust channels extends from the first connection tank to the outer sidewall of the second connection tank.

According to the above objectives, the present disclosure further provides a switchable projector module. The switchable projector module includes a circuit substrate, a holder, a light-emitting device, a switchable diffuser, and a diffraction optical element. The holder is disposed on the circuit substrate. The holder includes a first connection tank and a second connection tank, in which the second connection tank is located at one side of the first connection tank. The second connection has a spilling glue trench. The light-emitting device is disposed on the circuit substrate and is electrically connected to the circuit substrate. The light-emitting device is configured to emit a light beam toward the first connection tank. The switchable diffuser is disposed in the first connection tank and is electrically connected to the circuit substrate. The switchable diffuser is configured to switch between a first mode and a second mode, so as not to diffuse the light beam in the first mode and diffuse the light beam in the second mode. The diffraction optical element is disposed in the second connection tank and is electrically connected to the circuit substrate. The diffraction optical element has a pattern. The light beam without being diffused passes through the diffraction optical element to generate an image with the pattern, and the light beam being diffused passes through the diffraction optical element to generate another image without the pattern.

According to one embodiment of the present disclosure, the second connection tank includes an outer sidewall, the holder further includes a bonding wall disposed in the second connection tank and located inside the outer sidewall, and the diffraction optical element is bonded to a bonding surface of the bonding wall through an adhesive.

According to one embodiment of the present disclosure, the spilling glue trench is located between the outer sidewall and the bonding wall.

According to one embodiment of the present disclosure, the circuit substrate includes various wires, the wires are at least divided into a first wire set, a second wire set, and a third wire set. The switchable diffuser is electrically connected to the first wire set, the diffraction optical element is electrically connected to the second wire set, and the light-emitting device is electrically connected to the third wire set.

According to one embodiment of the present disclosure, the holder further includes a first connecting wire set and a second connecting wire set. The first connecting wire set extends from the first connection tank through an outer side surface of the holder to a bottom surface of the holder for electrically connecting the switchable diffuser and the first wire set. The second connecting wire set extends from the second connection tank through the outer side surface of the holder to the bottom surface of the holder for electrically connecting the diffraction optical element and the second wire set.

According to one embodiment of the present disclosure, each of the first connecting wire set and the second connecting wire set includes two laser direct structuring wires.

According to one embodiment of the present disclosure, each of the first connecting wire set and the second connecting wire set includes two insert molding wires.

BRIEF DESCRIPTION OF THE DRAWINGS

Aspects of the present disclosure are best understood from the following detailed description in conjunction with the accompanying figures. It is noted that in accordance with the standard practice in the industry, various features are not drawn to scale. In fact, dimensions of the various features can be arbitrarily increased or reduced for clarity of discussion.

DETAILED DESCRIPTION

Figure 1:
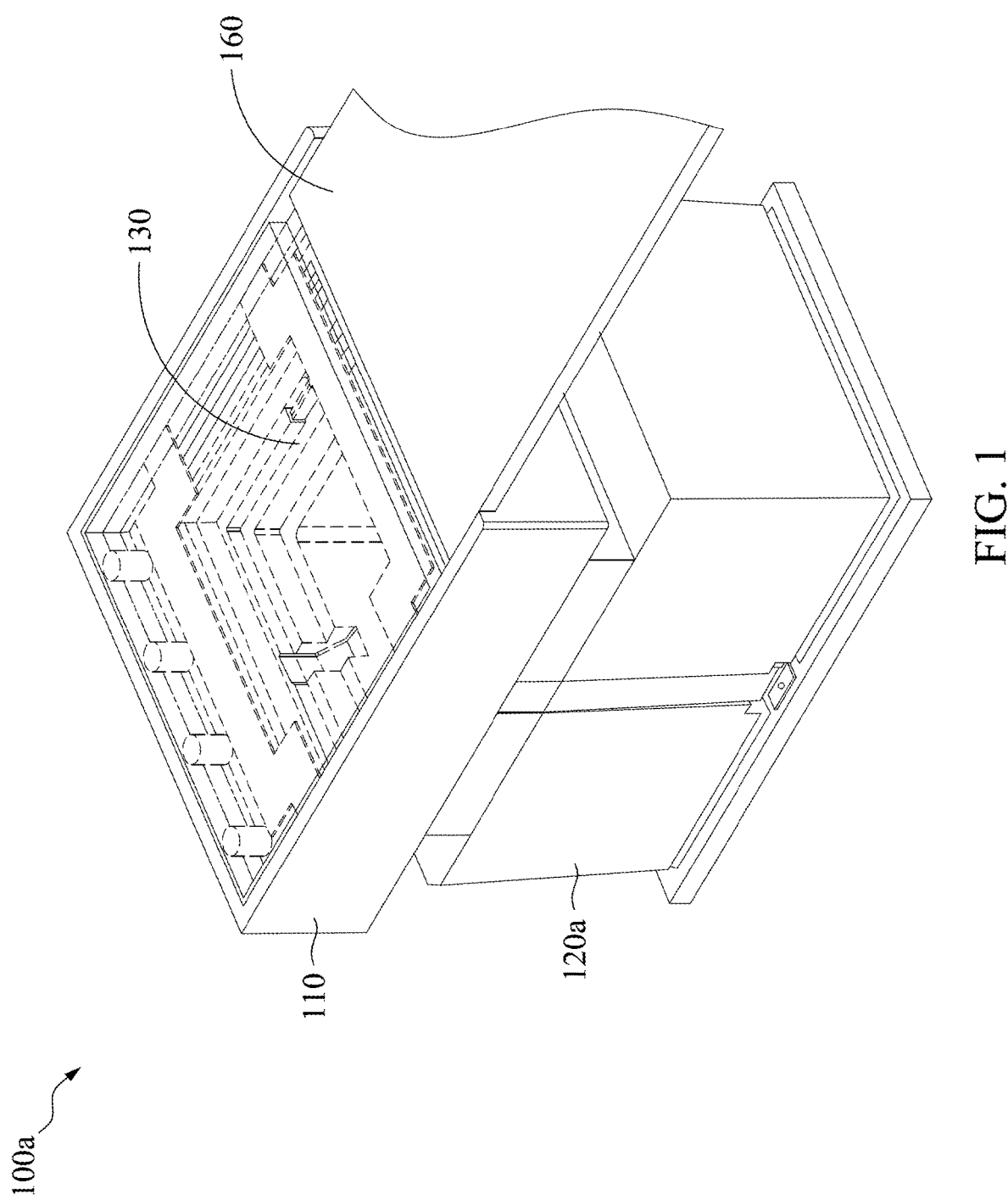
FIG. 1 is a schematic three-dimensional diagram of a switchable projector module in accordance with a first embodiment of the present disclosure.

The embodiments of the present disclosure are discussed in detail below. However, it will be appreciated that the embodiments provide many applicable concepts that can be implemented in various specific contents. The embodiments discussed and disclosed are for illustrative purposes only and are not intended to limit the scope of the present disclosure. All of the embodiments of the present disclosure disclose various different features, and these features may be implemented separately or in combination as desired.

In addition, the terms "first", "second", and the like, as used herein, are not intended to mean a sequence or order, and are merely used to distinguish elements or operations described in the same technical terms.

The spatial relationship between two elements described in the present disclosure applies not only to the orientation depicted in the drawings, but also to the orientations not represented by the drawings, such as the orientation of the inversion. Moreover, the terms "connected", "electrically connected", or the like between two components referred to in the present disclosure are not limited to the direct connection or electrical connection of the two components, and may also include indirect connection or electrical connection as required.

Figure 2:
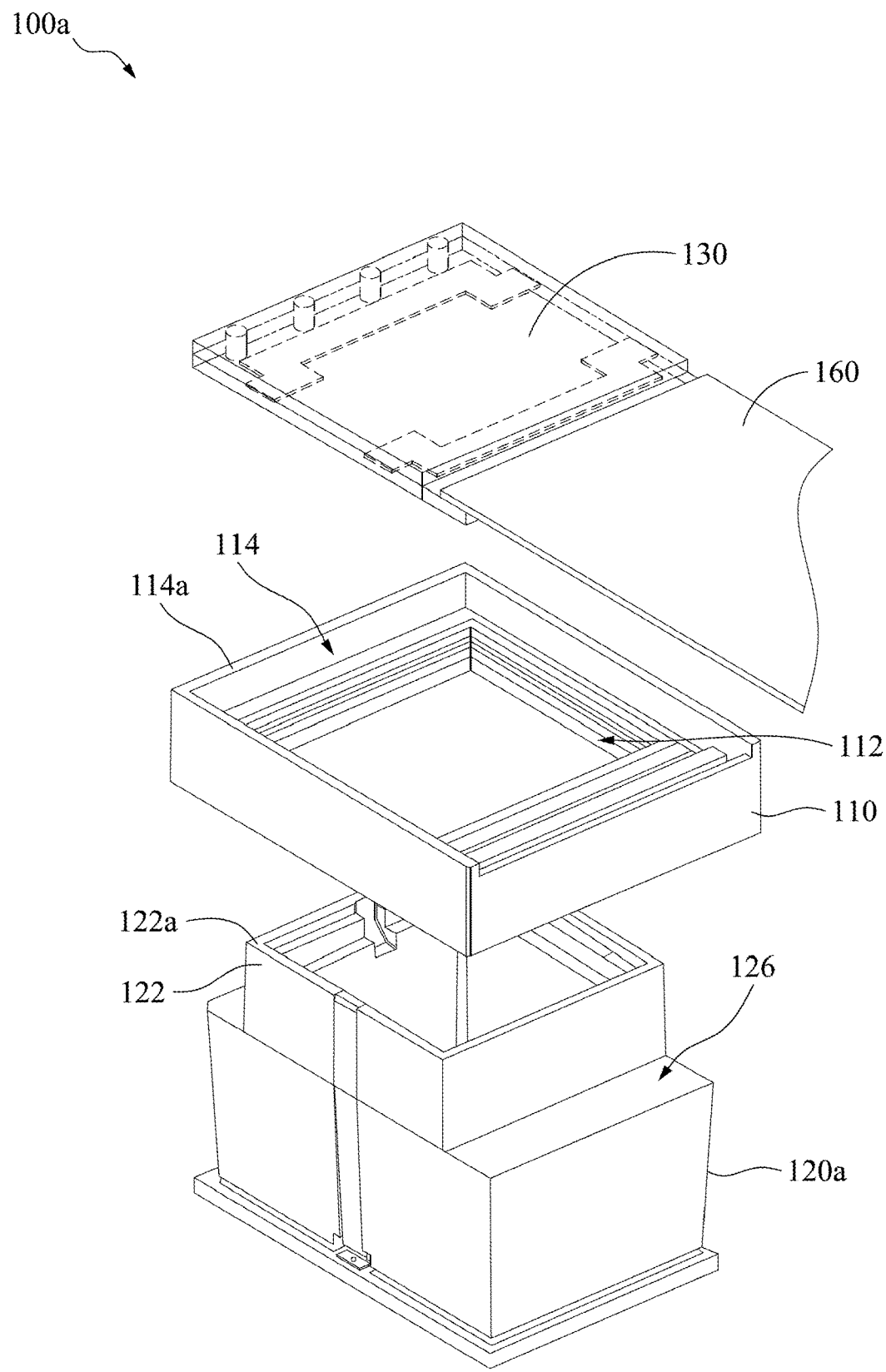
FIG. 2 is a schematic assembly drawing of a switchable projector module in accordance with the first embodiment of the present disclosure.
Figure 3:
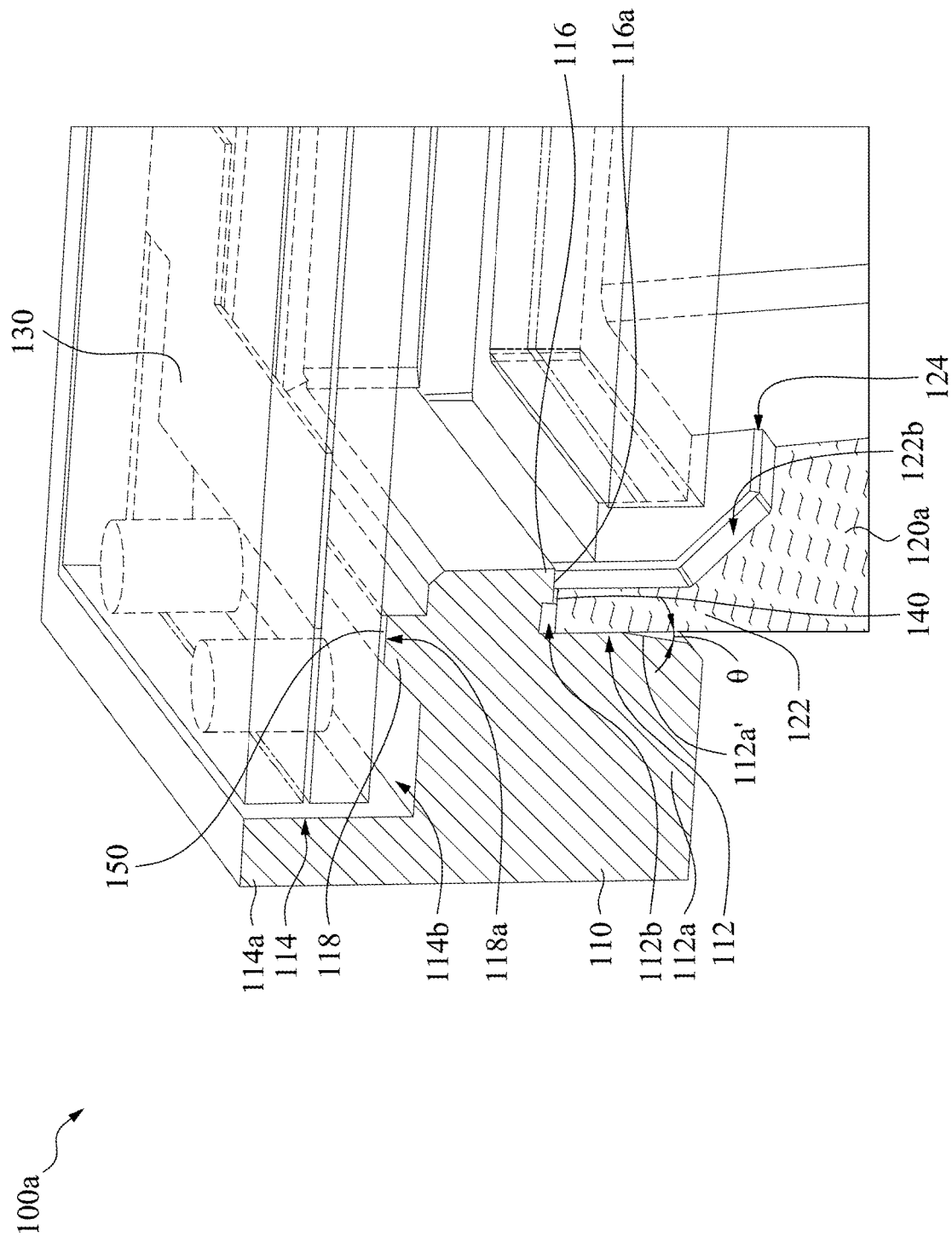
FIG. 3 is a schematic partial cross-sectional view of a switchable projector module in accordance with the first embodiment of the present disclosure.

Referring to FIG. 1 through FIG. 3, FIG. 1 is a schematic three-dimensional diagram of a switchable projector module in accordance with a first embodiment of the present disclosure, FIG. 2 is a schematic assembly drawing of a switchable projector module in accordance with the first embodiment of the present disclosure, and FIG. 3 is a schematic partial cross-sectional view of a switchable projector module in accordance with the first embodiment of the present disclosure. A switchable projector module 100*a* can be switched to provide spot projection or flood projection. The switchable projector module 100*a* is a separate type. The switchable projector module 100*a* may mainly include a holder 110, a projector 120*a*, and a switchable diffuser 130. The projector 120*a* and the switchable diffuser 130 can be integrated on the holder 110.

The holder 110 may be a hollow ring structure, such that a light beam or image can pass through the holder 110. The holder 110 includes a first connection tank 112 and a second connection tank 114. The first connection tank 112 and the second connection tank 114 are respectively connected with the projector 120*a* and the switchable diffuser 130. The second connection tank 114 is located at a side of the first connection tank 112. For example, as shown in FIG. 3, the second connection tank 114 is located above the first connection tank 112.

The projector 120a is engaged with the first connection tank 112. For example, as shown in FIG. 3, the first connection tank 112 may include an outer sidewall 112a, and the outer sidewall 112a may be a ring structure, such that the projector 120a may be embedded in the outer sidewall 112a. In some exemplary examples, an inner side surface 112a' of the outer sidewall 112a is inclined towards an outside of the outer sidewall 112a at an angle θ, such that the inner side surface 112a' of the outer sidewall 112a can guide the projector 120a into the outer sidewall 112a. The angle θ may be about 10 degrees. The projector 120a is configured to project a pattern image from the first connection tank 112 onto the second connection tank 114. In some exemplary examples, the projector 120a is a liquid crystal projector (LCP).

In some examples, as shown in FIG. 3, the holder 110 further includes a bonding wall 116, in which the bonding wall 116 is disposed in the first connection tank 112 and is located inside the outer sidewall 112a. The bonding wall 116 may be, for example, a ring structure. The bonding wall 116 has a bonding surface 116a. The bonding surface 116a may be a flat surface. The projector 120a includes a connection portion 122, and the connection portion 122 has a bonding surface 122a. The bonding surface 122a may be, for example, a flat surface. The bonding surface 122a of the connection portion 122 of the projector 120a may be bonded to the bonding surface 116a of the bonding wall 116 through an adhesive 140. That is the adhesive 140 is sandwiched between the bonding surface 122a of the connection portion 122 and the bonding surface 116a of the bonding wall 116. In such examples, the first connection tank 112 may include a spilling glue trench 112b. The spilling glue trench 112b is located between the outer sidewall 112a and the bonding wall 116, such that an excessive portion of the adhesive 140 can flow to the spilling glue trench 112b, thereby preventing the excessive portion of the adhesive 140 from flowing to unexpected areas. In certain examples, the projector 120a may be tightly fitted to the holder 110, such that the adhesive 140 can be omitted.

In some examples, the projector 120a has a gas exhaust channel 124. The gas exhaust channel 124 may be disposed in an inner side 122b of the connection portion 122 of the projector 120a. During sequential high-temperature processes, the gas inside the switchable projector module 100a will expand, and the gas exhaust channel 124 is used to discharge the gas from the switchable projector module 100a to prevent the internal components of the switchable projector module 100a from being damaged by the expanded gas. In the example shown in FIG. 2, the projector 120a has a platform structure 126.

The switchable diffuser 130 is engaged with the second connection tank 114. For example, as shown in FIG. 2 and FIG. 3, the second connection tank 114 may include an outer sidewall 114a. In some exemplary examples, viewed from the above, the holder 110 is quadrilateral. As shown in FIG. 1, the outer sidewall 114a may be a C-shaped structure, i.e. the outer sidewall 114a is disposed on three sides of the holder 110. Thus, the switchable diffuser 130 can be inserted into the outer sidewall 114a of the second connection tank 114 from the remaining side of the holder 110.

In some examples, as shown in FIG. 3, the holder 110 further includes a bonding wall 118, in which the bonding wall 118 is disposed in the second connection tank 114 and is located inside the outer sidewall 114a. The bonding wall 118 may be, for example, a ring structure. The bonding wall 118 has a bonding surface 118a. The bonding surface 118a may be a flat surface. The switchable diffuser 130 may be bonded to the bonding surface 118a of the bonding wall 118 through an adhesive 150. That is the adhesive 150 is sandwiched between the switchable diffuser 130 and the bonding surface 118a of the bonding wall 118. In the examples, the second connection tank 114 may include a spilling glue trench 114b. The spilling glue trench 114b is located between the outer sidewall 114a and the bonding wall 118, such that an excessive portion of the adhesive 150 can flow to the spilling glue trench 114b, thereby preventing the excessive portion of the adhesive 150 from flowing to unexpected areas. In certain examples, the switchable diffuser 130 may be fixed to the holder 110 by any suitable fixing methods without using the adhesive 150.

The switchable diffuser 130 can receive the pattern image projected from the projector 120a. The switchable diffuser 130 can be switched between a first mode and a second mode. When the switchable diffuser 130 is controlled to operate in the first mode, the switchable diffuser 130 operates as a transparent plate to allow the pattern image to pass through without diffusing the pattern image, such that the pattern image is projected out of the switchable projector module 100a through the switchable diffuser 130. When the switchable diffuser 130 is controlled to operate in the second mode, the switchable diffuser 130 operates as the diffuser to diffuse or scatter the pattern image, so as to make the pattern image projected from the projector 120a is uniform illumination. That is, because the switchable diffuser 130 diffuses the received pattern image, the image projected from the switchable projector module 100a does not have the pattern of the pattern image. The switchable diffuser 130 may be a liquid crystal diffuser, a polymer composite device, an electrowetting device, or an electrophoresis device.

In some examples, the switchable diffuser 130 is electrically connected to a circuit board 160, such that control signals can be transmitted to the switchable diffuser 130 through the circuit board 160. For example, the circuit board 160 may be a flexible circuit board (FCB).

With the holder 110, the switchable diffuser 130 can be integrated into the projector 120a to form the switchable projector module 100a with a spot protection function and a flood protection function.

In the present embodiment, the holder can be designed according to the switchable diffuser and the projector, which are to be combined together. Therefore, the switchable diffuser can be added to any projector to form the switchable projector module.

Figure 4:
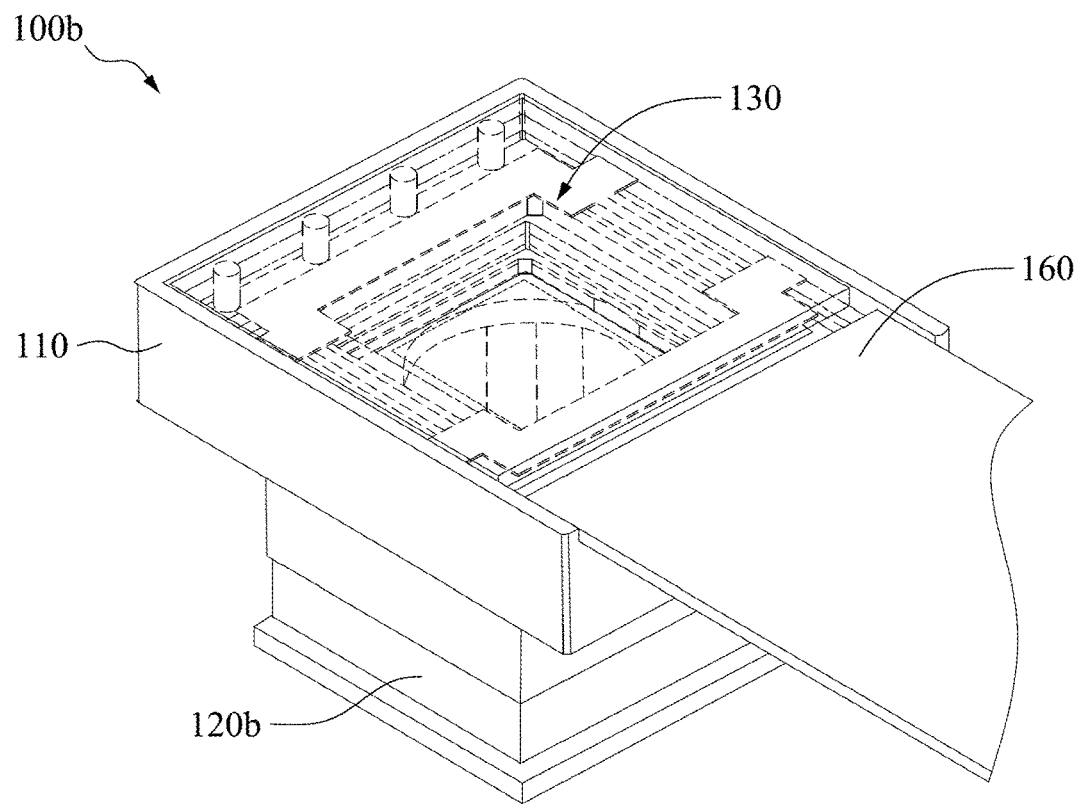
FIG. 4 is a schematic three-dimensional diagram of a switchable projector module in accordance with a second embodiment of the present disclosure.
Figure 5:
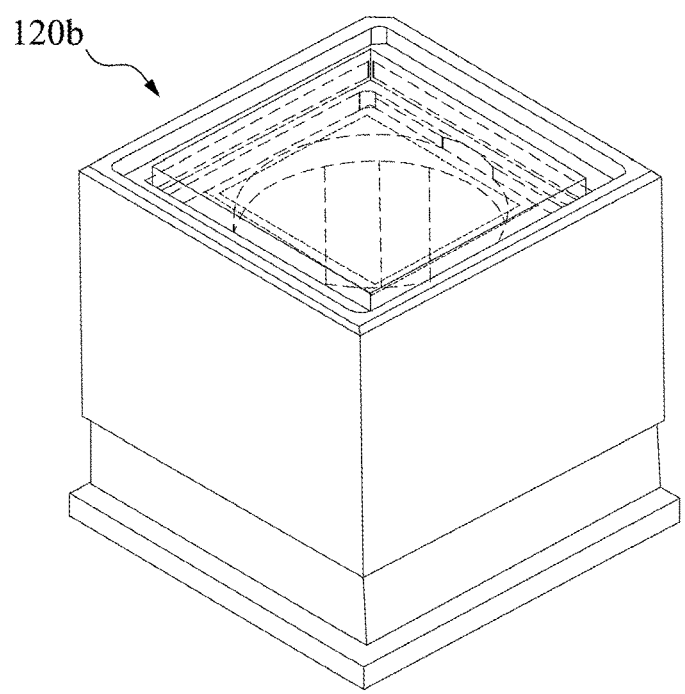
FIG. 5 is a schematic three-dimensional diagram of a projector of a switchable projector module in accordance with the second embodiment of the present disclosure.

Referring to FIG. 4 and FIG. 5, FIG. 4 is a schematic three-dimensional diagram of a switchable projector module in accordance with a second embodiment of the present disclosure, and FIG. 5 is a schematic three-dimensional diagram of a projector of a switchable projector module in accordance with the second embodiment of the present disclosure. A configuration of a switchable projector module 100b is similar to that of the switchable projector module 100a, and a difference between the switchable projector module 100b and 100a is that the a projector 120b of the switchable projector module 100b has a different structure from the projector 120a of the switchable projector module 100a. The projector 120b does not have a platform structure.

Figure 6:
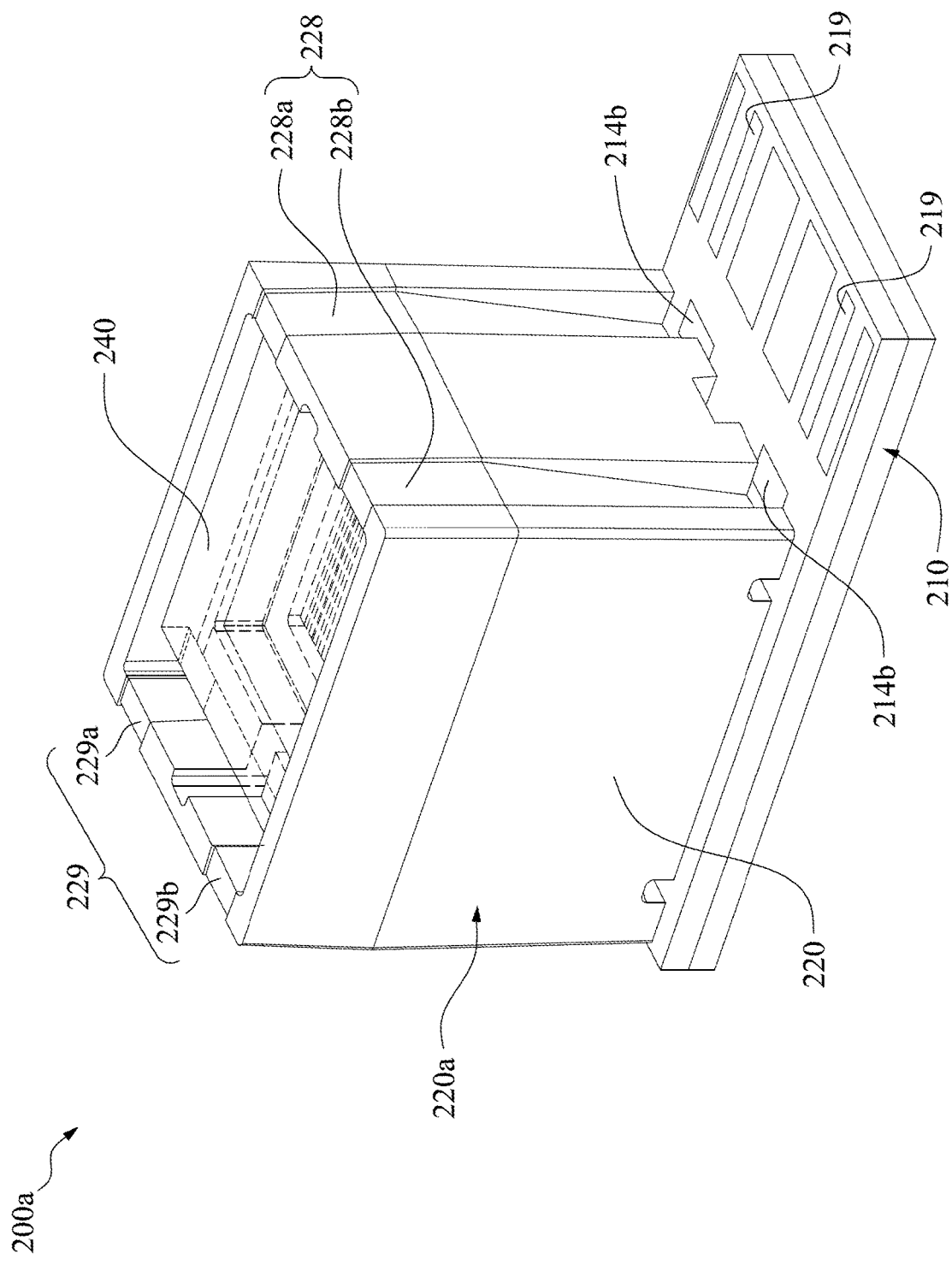
FIG. 6 is a schematic three-dimensional diagram of a switchable projector module in accordance with a third embodiment of the present disclosure.
Figure 7:
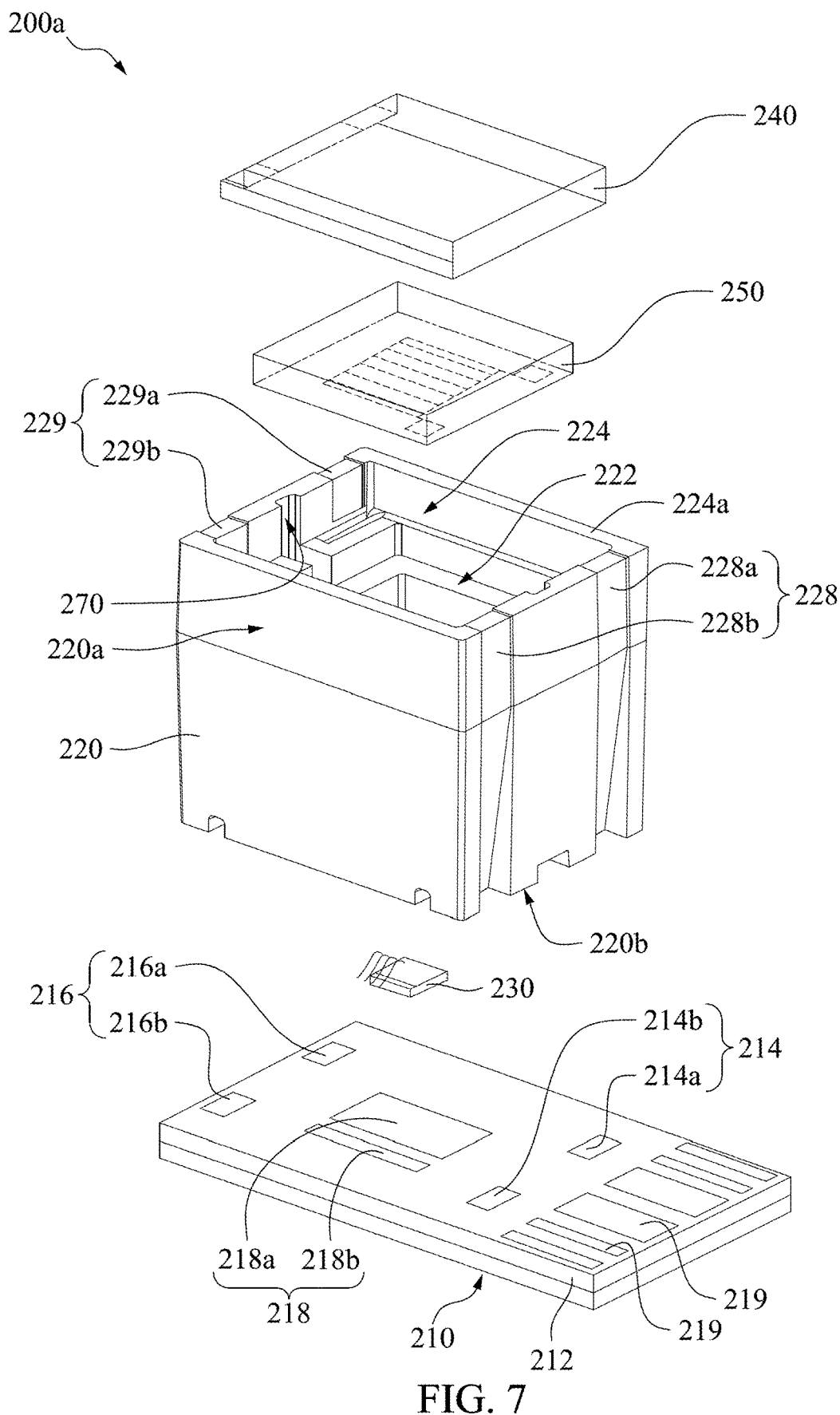
FIG. 7 is a schematic assembly drawing of a switchable projector module in accordance with the third embodiment of the present disclosure.
Figure 8:
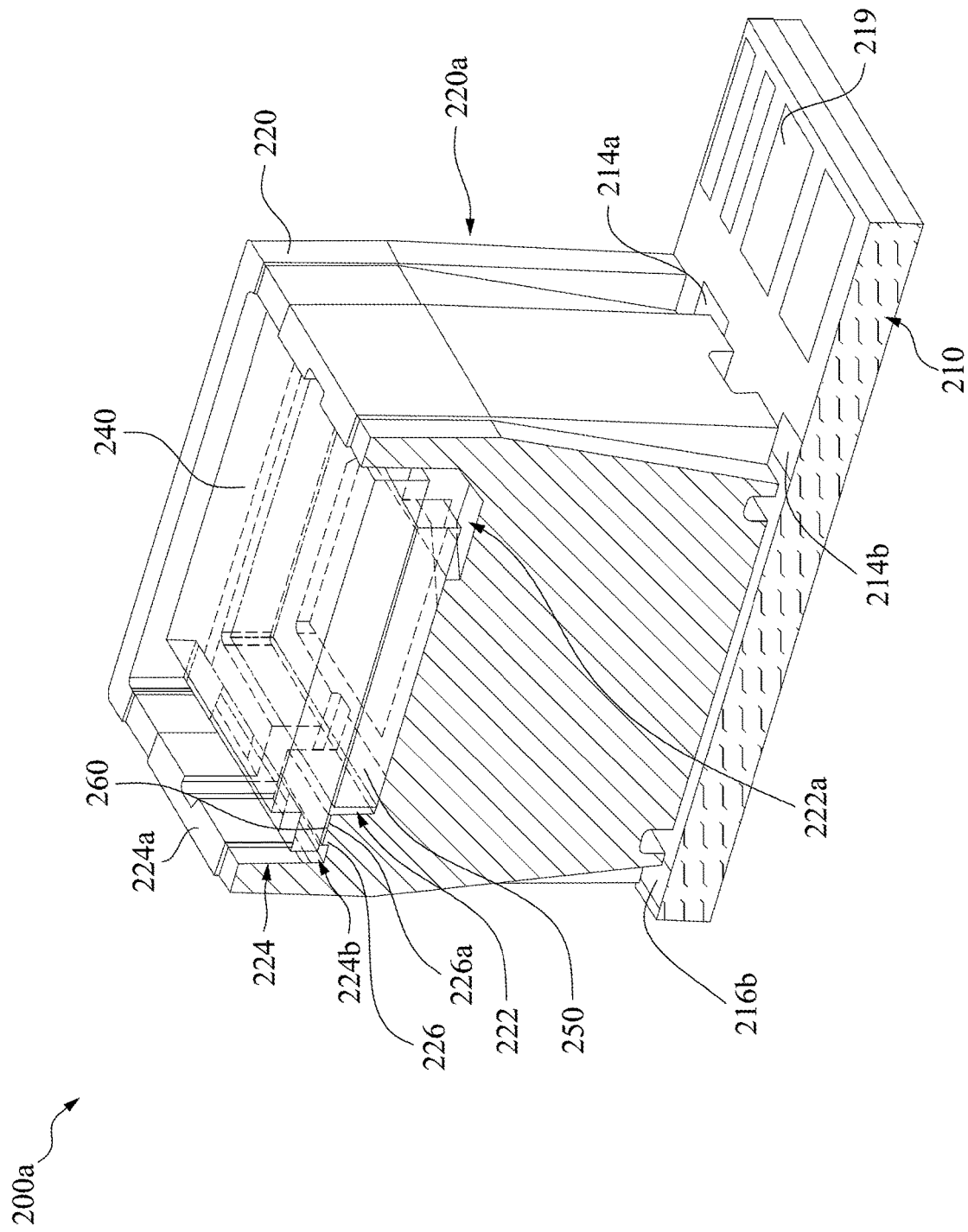
FIG. 8 is a schematic cross-sectional view of a switchable projector module in accordance with the third embodiment of the present disclosure.

Referring to FIG. 6 through FIG. 8, FIG. 6 is a schematic three-dimensional diagram of a switchable projector module in accordance with a third embodiment of the present disclosure, FIG. 7 is a schematic assembly drawing of a switchable projector module in accordance with the third embodiment of the present disclosure, and FIG. 8 is a schematic cross-sectional view of a switchable projector module in accordance with the third embodiment of the present disclosure. Unlike the switchable projector modules 100a and 100b, a switchable projector module 200a is an integrated type. The switchable projector module 200a may mainly include a circuit substrate 210, a holder 220, a light-emitting device 230, a switchable diffuser 240, and a diffraction optical element 250. The circuit substrate 210, the light-emitting device 230, and the diffraction optical element 250 may collectively form a projector.

In some examples, as shown in FIG. 7, the circuit substrate 210 includes a substrate 212, and wires 214a, 214b, 216a, 216b, 218a, and 218b. The wires 214a, 214b, 216a, 216b, 218a, and 218b are divided into a first wire set 214, a second wire set 216, and a third wire set 218, in which the first wire set 214 includes the wires 214a and 214b, the second wire set 216 includes the wires 216a and 216b, and the third wire set 218 includes the wires 218a and 218b. The substrate 212 may be, for example, an aluminum nitride (AlN) substrate. In some exemplary, the circuit substrate 210 further includes some wires 219. The wires 214a, 214b, 216a, 216b, 218a, 218b, and wires 219 may be formed from any suitable conductive materials.

The holder 220 is disposed on the circuit substrate 210. The holder 220 may be a hollow ring structure. As shown in FIG. 7 and FIG. 8, the holder 220 includes a first connection tank 222 and a second connection tank 224. The first connection tank 222 and the second connection tank 224 are respectively connected with the projector and the switchable diffuser 240. The second connection tank 224 is located at one side of the first connection tank 222. For example, as shown in FIG. 8, the second connection tank 224 is located above the first connection tank 222.

In some examples, as shown in FIG. 7, the projector 220 has gas exhaust channels 270. Each of the gas exhaust channels 270 may extend from the first connection tank 222 to the outer sidewall 224a of the second connection tank 224. During sequential high-temperature processes, the gas exhaust channels 270 are used to discharge the gas from the switchable projector module 200a to prevent the internal components of the switchable projector module 200a from being damaged by the expanded gas.

The light-emitting device 230 of the projector is disposed on the circuit substrate 210, and is electrically connected to the circuit substrate 210, such that power can be supplied to the light-emitting device 230 through the circuit substrate 210. For example, as shown in FIG. 7, the light-emitting device 230 may be electrically connected to the wires 218a and 218b of the third wire set 218. The light-emitting device 230 is configured to emit a light beam toward the first connection tank 222. In some examples, the light-emitting device 230 is a vertical cavity surface emitting laser (VCSEL) or an edge emitting laser (EEL), such that the light-emitting device 230 can emit a laser light beam.

The switchable diffuser 240 is engaged with the second connection tank 224. For example, as shown in FIG. 7, the second connection tank 224 may include an outer sidewall 224a. The outer sidewall 224a may be a ring structure. As shown in FIG. 8, the switchable diffuser 240 may be embedded in the outer sidewall 224a of the second connection tank 224. The switchable diffuser 240 is electrically connected to the circuit substrate 210. In some examples, the holder 220 further includes a first connecting wire set 228. The first connecting wire set 228 may include two wires 228a and 228b. The wires 228a and 228b extending from the second connection tank 224 through an outer side surface 220a of the holder 220 to a bottom surface 220b of the holder 220, in which the outer side surface 220a is a ring surface. Thus, when the holder 220 is disposed on the circuit substrate 210, the wires 228a and 228b of the first connecting wire set 228 electrically connect the switchable diffuser 240 to the wires 214a and 214b of the first wire set 214. Therefore, control signals can be transmitted to the switchable diffuser 240 through the circuit substrate 210. Each of the wires 228a and 228b is a laser direct structuring wire. A material of the wires 228a and 228b may include copper and gold. The switchable diffuser 240 may be a liquid crystal diffuser, a polymer composite device, an electrowetting device, or an electrophoresis device.

In some examples, as shown in FIG. 8, the holder 220 further includes a bonding wall 226. The bonding wall 226 is disposed in the second connection tank 224 and is located inside the outer sidewall 224a. The bonding wall 226 may be, for example, a ring structure. The bonding wall 226 has a bonding surface 226a. The bonding surface 226a may be a flat surface. The switchable diffuser 240 may be bonded to the bonding surface 226a of the bonding wall 226 through an adhesive 260, such that the adhesive 260 may be sandwiched between the switchable diffuser 240 and the bonding surface 226a of the bonding wall 226. In the examples, the second connection tank 224 may include a spilling glue trench 224b. The spilling glue trench 224b is located between the outer sidewall 224a and the bonding wall 226 for accommodating an excessive portion of the adhesive 260. In certain examples, the switchable diffuser 240 may be fixed to the holder 220 by any suitable fixing methods without using the adhesive 260.

As shown in FIG. 8, the diffraction optical element 250 is disposed in the first connection tank 222 and is electrically connected to the circuit substrate 210. In some examples, the holder 220 further includes a second connecting wire set 229. The second connecting wire set 229 may include two wires 229a and 229b. The wires 229a and 229b extending from the first connection tank 222 through the outer side surface 220a to the bottom surface 220b of the holder 220. When the holder 220 is disposed on the circuit substrate 210, the wires 229a and 229b of the second connecting wire set 229 electrically connect the diffraction optical element 250 to the wires 216a and 216b of the second wire set 216. Each of the wires 229a and 229b is a laser direct structuring wire. A material of the wires 229a and 229b may include copper and gold.

The diffraction optical element 250 may be bonded to the first connection tank 222 through an adhesive (not shown), in which the adhesive is sandwiched between a bottom surface and or a side surface of the first connection tank 222 and the diffraction optical element 250. In such examples, the first connection tank 222 may include spilling glue trench 222a, in which the spilling glue trench 222a is recessed in a portion of the bottom surface of the first connection tank 222.

The diffraction optical element 250 has a pattern. When the light-emitting device 230 emit a light beam toward the diffraction optical element 250 in the first connection tank 222, and the light beam passes through the diffraction optical element 250 to generate a pattern image. The switchable diffuser 240 can receive the pattern image projected from the diffraction optical element 250 of the projector. The switchable diffuser 240 can be switched to operate in a first mode or a second mode. When the switchable diffuser 240 is controlled to operate in the first mode, the switchable diffuser 240 operates to allow the pattern image to pass through without diffusing the pattern image, such that the pattern image is projected out of the switchable projector module 200a through the switchable diffuser 240. When the switchable diffuser 240 is controlled to operate in the second mode, the switchable diffuser 240 operates to diffuse or scatter the pattern image, so as to make the pattern image projected from the projector is uniform illumination. Thus, the image projected from the switchable projector module 200a does not have the pattern of the pattern image.

The switchable diffuser 240 and the diffraction optical element 250 can be embedded into the holder 220 to form the switchable projector module 200a with a spot protection function and a flood protection function. Therefore, the switchable projector module 200a is more compact, and the footprint of the switchable projector module 200a is greatly reduced. Furthermore, the first connecting wire set 228 and the second connecting wire set 229 are formed by using a laser direct structuring process, such that a sample product is produced quickly.

Figure 9:
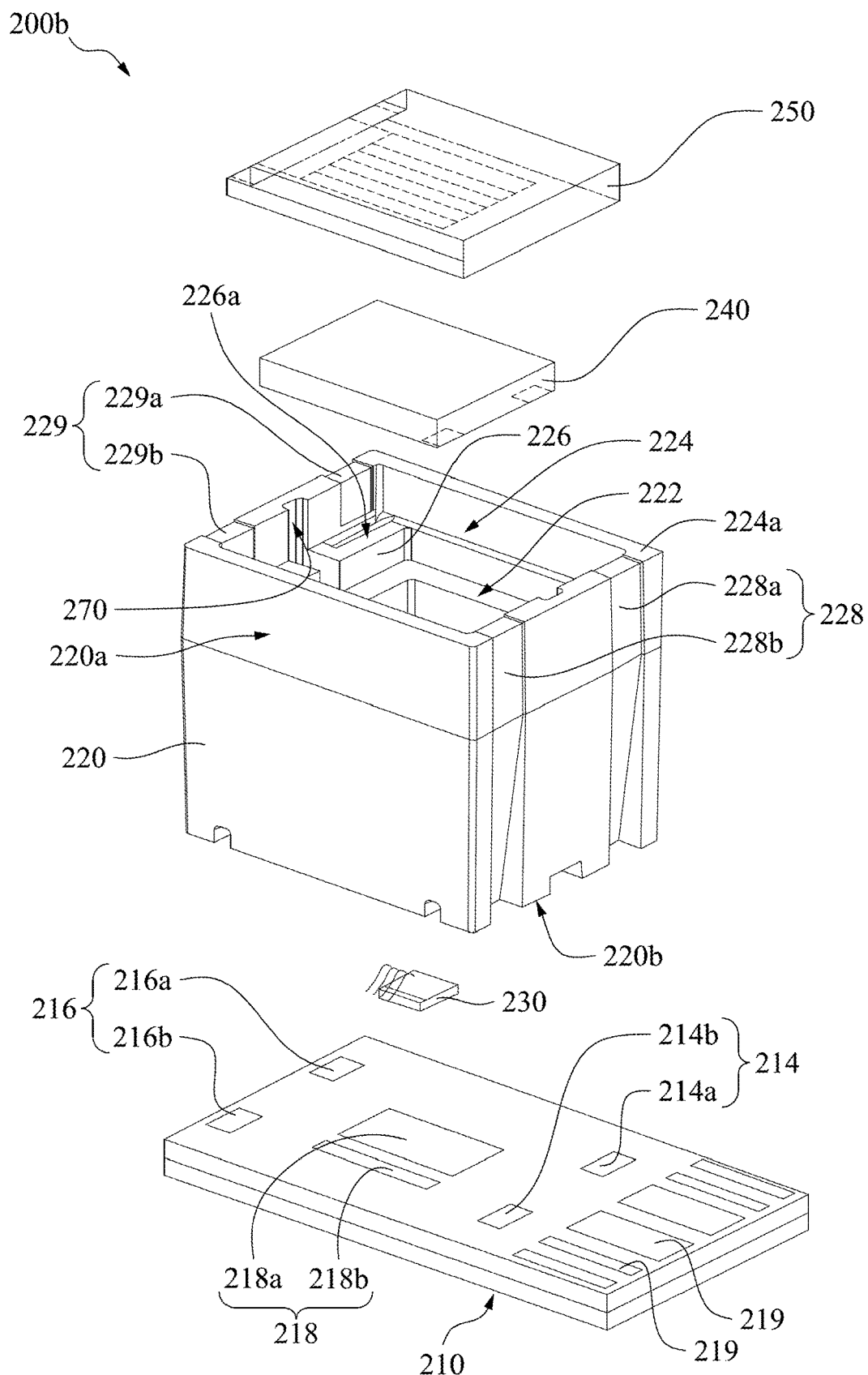
FIG. 9 is a schematic assembly drawing of a switchable projector module in accordance with a fourth embodiment of the present disclosure.

Referring to FIG. 9, FIG. 9 is a schematic assembly drawing of a switchable projector module in accordance with a fourth embodiment of the present disclosure. In the present embodiment, a configuration of a switchable projector module 200b is similar to that of the switchable projector module 200a, and a different between the switchable projector modules 200b and 200a is that the positions of the switchable diffuser 240 and the diffraction optical element 250 in the switchable projector module 200b are reversed. That is, the switchable diffuser 240 is disposed in the first connection tank 222, and the diffraction optical element 250 is disposed in the second connection tank 224. The diffraction optical element 250 may be bonded to the bonding surface 226a of the bonding wall 226 through the adhesive 260 shown in FIG. 8.

In addition, according to the change of the positions of the switchable diffuser 240 and the diffraction optical element 250, the wires 228a and 228b of the first connecting wire set 228 extend from the first connection tank 222 through the outer side surface 220a the bottom surface 220b of the holder 220 to electrically connect the switchable diffuser 240 and the wires 214a and 214b of the first wire set 214. The wires 229a and 229b of the second connecting wire set 229 extend from the second connection tank 224 through the outer side surface 220a the bottom surface 220b of the holder 220 to electrically connect the diffraction optical element 250 and the wires 216a and 216b of the second wire set 216.

In the present embodiment, the light-emitting device 230 is used to emit a light beam toward the switchable diffuser 240 in the first connection tank 222. When the switchable diffuser 240 is controlled to operate in the first mode, the switchable diffuser 240 operates to allow the light beam to pass through without diffusing the light beam. After passing through the switchable diffuser 240, the light beam without being diffused passes through the diffraction optical element 250 to generate an image with the pattern. When the switchable diffuser 240 is controlled to operate in the second mode, the switchable diffuser 240 operates to diffuse or scatter the light beam. After passing through the switchable diffuser 240, the light beam being diffused passes through the diffraction optical element 250 to generate another image without the pattern.

Figure 10:
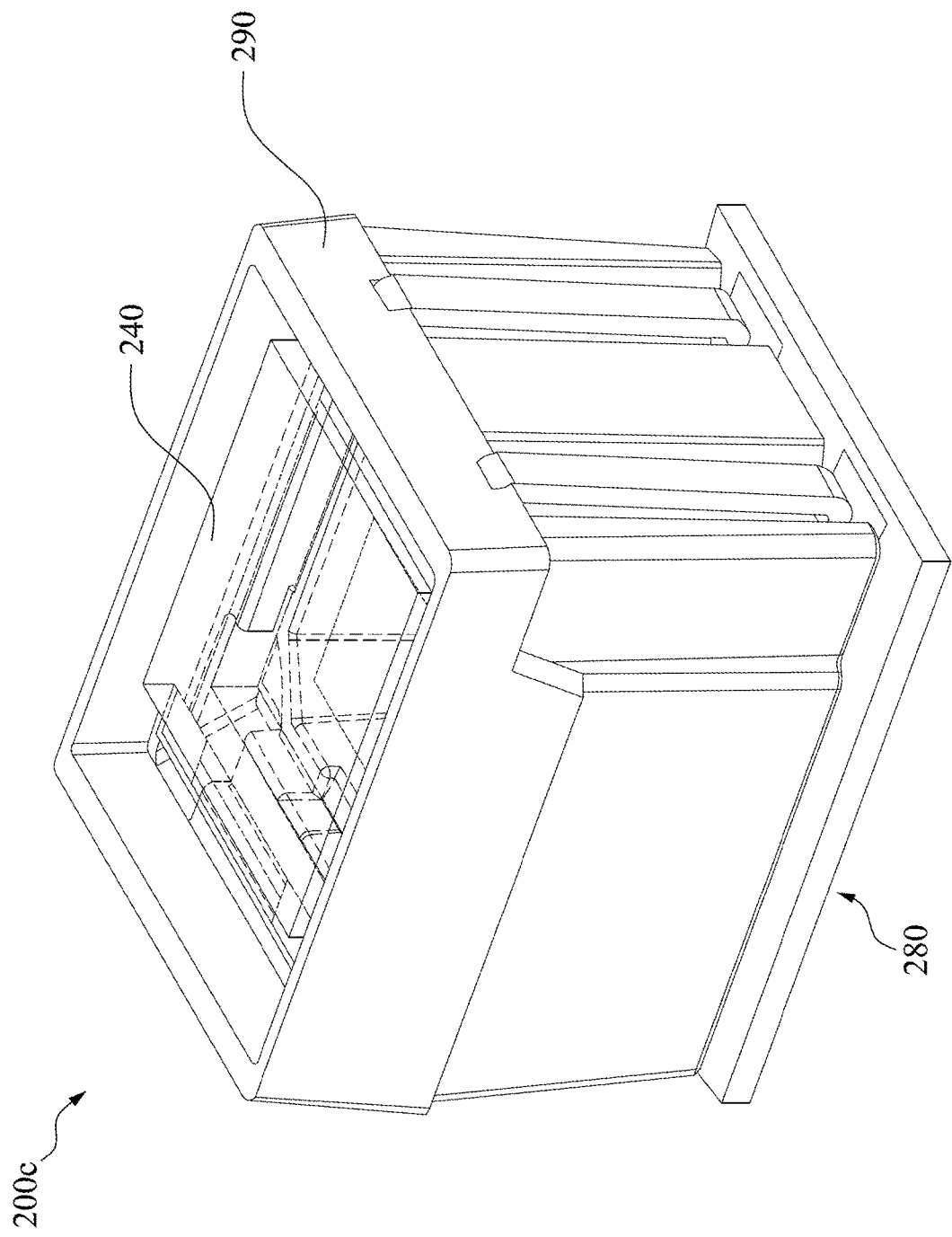
FIG. 10 is a schematic three-dimensional diagram of a switchable projector module in accordance with a fifth embodiment of the present disclosure.
Figure 11:
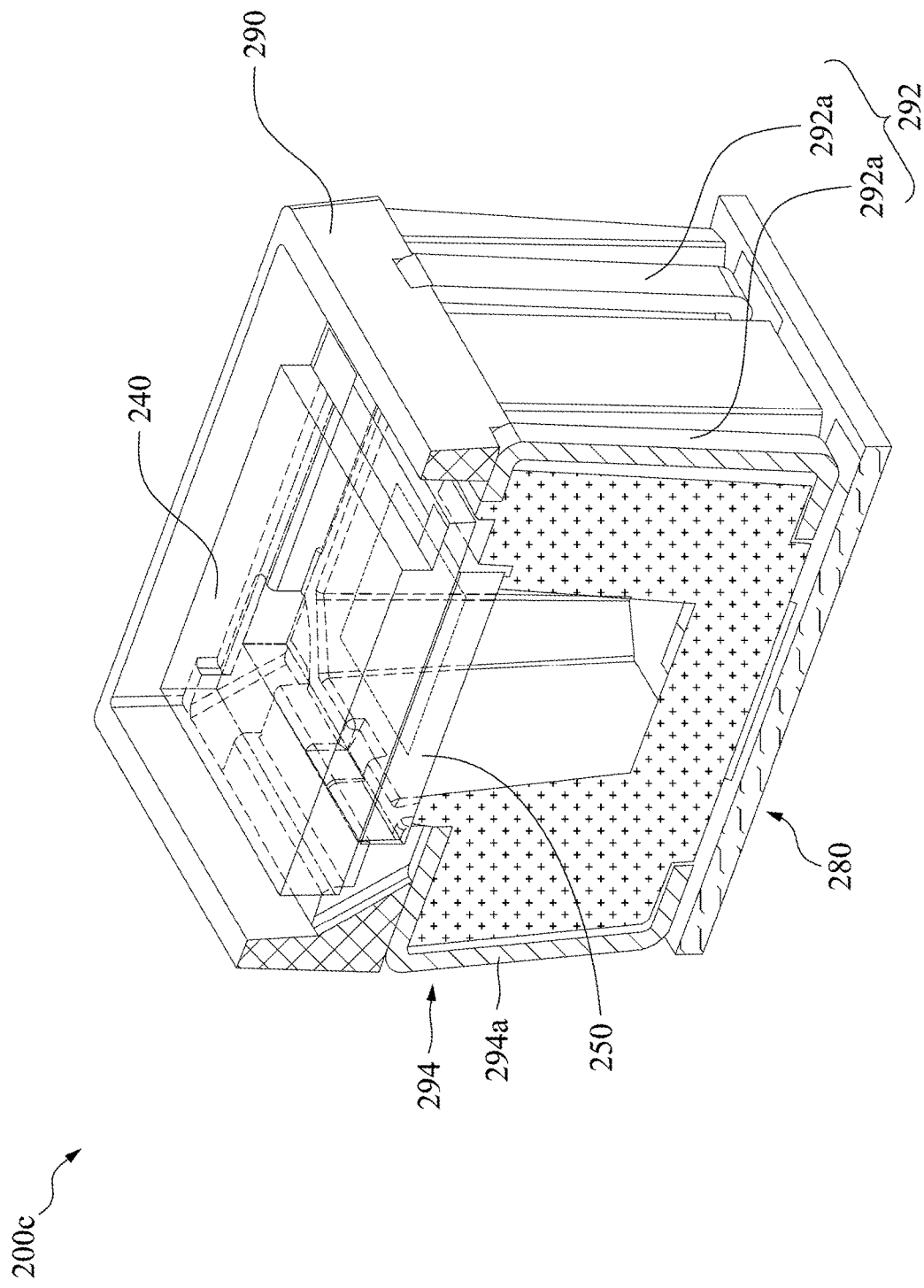
FIG. 11 is a schematic cross-sectional view of a switchable projector module in accordance with the fifth embodiment of the present disclosure.

Referring to FIG. 10 and FIG. 11, FIG. 10 is a schematic three-dimensional diagram of a switchable projector module in accordance with a fifth embodiment of the present disclosure, and FIG. 11 is a schematic cross-sectional view of a switchable projector module in accordance with the fifth embodiment of the present disclosure. A configured of a switchable projector module 200c of the present embodiment is similar to that of the switchable projector module 200a. Differences between the switchable projector module 200c and 200a are that a holder 290, a first connecting wire set 292, and a second connecting wire set 294 of the switchable projector module 200c are formed by using an insert molding process, and a structure of a circuit substrate 280 is different from that of the circuit substrate 210 of the switchable projector module 200a.

In the switchable projector module 200c, the first connecting wire set 292 includes two wires 292a on one side of the holder 290, and the second connecting wire set 294 includes two wires 294a on another side of the holder 290 opposite to the wires 292a. Each of the wires 292a and 294a is an insert molding wires. A material of the wires 292a and 294a may include copper. Manufacturing the holder 290, the first connecting wire set 292, and the second connecting wire set 294 can reduce the cost of the switchable projector module 200c. For example, the cost of the switchable projector module 200c may be 50% cheaper than that of the switchable projector module 200a.

According to the embodiments described above, one advantage of the present disclosure is that a holder is used to combine a projector and a switchable diffuser, such that one single projector module can provide dual functions of spot and flood, which can significantly reduce the footprint of the switchable projector module.

According to the embodiments described above, another advantage of the present disclosure is that a switchable diffuser and a diffraction optical element are integrated with a holder, such that the switchable projector module is easier to assemble and more compact.

The features of several embodiments are outlined above, so those skilled in the art can understand the aspects of the present disclosure. Those skilled in the art will appreciate that the present disclosure can be readily utilized as a basis for designing or modifying other processes and structures, thereby achieving the same objectives and/or achieving the same advantages as the embodiments described herein. Those skilled in the art should also understand that these equivalent constructions do not depart from the spirit and scope of the present disclosure, and they can make various changes, substitutions, and alteration without departing from the spirit and scope of the present disclosure.

What is claimed is:

1. A switchable projector module, comprising:
   a holder comprising a first connection tank and a second connection tank, wherein the second connection tank is located at a side of the first connection tank, and the second connection tank has a spilling glue trench;
   a projector engaged with the first connection tank and configured to project a pattern image onto the second connection tank; and
   a switchable diffuser engaged with the second connection tank, wherein the switchable diffuser is configured to switch between a first mode and a second mode, so as not to diffuse the pattern image in the first mode and diffuse the pattern image in the second mode.

2. The switchable projector module of claim 1, wherein the first connection tank comprises an outer sidewall, and the projector is embedded in the outer sidewall.

3. The switchable projector module of claim 2, wherein an inner side surface of the outer sidewall is inclined towards an outside of the outer sidewall at an angle to guide the projector into the outer sidewall.

4. The switchable projector module of claim 2, wherein the holder further comprises a bonding wall disposed in the first connection tank, and a connection portion of the projector is bonded to a bonding surface of the bonding wall through an adhesive.

5. The switchable projector module of claim 4, wherein the first connection tank comprises another spilling glue trench between the outer sidewall and the bonding wall.

6. The switchable projector module of claim 4, wherein the projector has a gas exhaust channel disposed in an inner side of the connection portion.

7. The switchable projector module of claim 1, wherein the second connection tank comprises an outer sidewall, the holder further comprises a bonding wall disposed in the second connection tank and located inside the outer sidewall, and the switchable diffuser is bonded to a bonding surface of the bonding wall through an adhesive.

8. The switchable projector module of claim 7, wherein the spilling glue trench is located between the outer sidewall and the bonding wall.

9. The switchable projector module of claim 1, wherein the projector comprises:
   a circuit substrate comprising a plurality of wires, wherein the wires are at least divided into a first wire set, a second wire set, and a third wire set, the holder is located on the circuit substrate, and the switchable diffuser is electrically connected to the first wire set;
   a diffraction optical element disposed in the first connection tank and electrically connected to the second wire set; and
   a light-emitting device disposed on the circuit substrate and electrically connected to the third wire set, wherein the light-emitting device is configured to emit a light beam toward the diffraction optical element, and the light beam passes through the diffraction optical element to generate the pattern image.

10. The switchable projector module of claim 9, wherein the holder comprises:
    a first connecting wire set extending from the second connection tank through an outer side surface of the holder to a bottom surface of the holder for electrically connecting the switchable diffuser and the first wire set; and
    a second connecting wire set extending from the first connection tank through the outer side surface of the holder to the bottom surface of the holder for electrically connecting the diffraction optical element and the second wire set.

11. The switchable projector module of claim 10, wherein each of the first connecting wire set and the second connecting wire set comprises two laser direct structuring wires.

12. The switchable projector module of claim 10, wherein each of the first connecting wire set and the second connecting wire set comprises two insert molding wires.

13. The switchable projector module of claim 9, wherein the second connection tank comprises an outer sidewall, the holder has a plurality of gas exhaust channels, and each of the gas exhaust channels extends from the first connection tank to the outer sidewall of the second connection tank.

14. A switchable projector module, comprising:
    a circuit substrate;
    a holder disposed on the circuit substrate and comprising a first connection tank and a second connection tank, wherein the second connection tank is located at one side of the first connection tank, and the second connection has a spilling glue trench;
    a light-emitting device disposed on the circuit substrate and electrically connected to the circuit substrate, wherein the light-emitting device is configured to emit a light beam toward the first connection tank;
    a switchable diffuser disposed in the first connection tank and electrically connected to the circuit substrate, wherein the switchable diffuser is configured to switch between a first mode and a second mode, so as not to diffuse the light beam in the first mode and diffuse the light beam in the second mode; and
    a diffraction optical element disposed in the second connection tank and electrically connected to the circuit substrate, wherein the diffraction optical element has a pattern, the light beam without being diffused passes through the diffraction optical element to generate an image with the pattern, and the light beam being diffused passes through the diffraction optical element to generate another image without the pattern.

15. The switchable projector module of claim 14, wherein the second connection tank comprises an outer sidewall, the holder further comprises a bonding wall disposed in the second connection tank and located inside the outer sidewall, and the diffraction optical element is bonded to a bonding surface of the bonding wall through an adhesive.

16. The switchable projector module of claim 15, wherein the spilling glue trench is located between the outer sidewall and the bonding wall.

17. The switchable projector module of claim 14, wherein the circuit substrate comprises a plurality of wires, the wires are at least divided into a first wire set, a second wire set, and a third wire set, the switchable diffuser is electrically connected to the first wire set, the diffraction optical element is electrically connected to the second wire set, and the light-emitting device is electrically connected to the third wire set.

18. The switchable projector module of claim 17, wherein the holder further comprises:
    a first connecting wire set extending from the first connection tank through an outer side surface of the holder to a bottom surface of the holder for electrically connecting the switchable diffuser and the first wire set; and
    a second connecting wire set extending from the second connection tank through the outer side surface of the holder to the bottom surface of the holder for electrically connecting the diffraction optical element and the second wire set.

19. The switchable projector module of claim 18, wherein each of the first connecting wire set and the second connecting wire set comprises two laser direct structuring wires.

20. The switchable projector module of claim 18, wherein each of the first connecting wire set and the second connecting wire set comprises two insert molding wires.

\* \* \* \* \*